(12) United States Patent
Wang et al.

(10) Patent No.: US 10,824,899 B2
(45) Date of Patent: Nov. 3, 2020

(54) STRUCTURAL CLUSTERING AND ALIGNMENT OF OCR RESULTS

(71) Applicant: Microsoft Technology Licensing, LLC, Redmond, WA (US)

(72) Inventors: Yan Wang, Mercer Island, WA (US); Arun Sacheti, Sammamish, WA (US); Vishal Chhabilbhai Thakkar, Kirkland, WA (US); Surendra Srinivas Ulabala, Bothell, WA (US); Shloak Jain, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 16/234,148

(22) Filed: Dec. 27, 2018

(65) Prior Publication Data

US 2020/0210743 A1    Jul. 2, 2020

(51) Int. Cl.
*G06K 9/46*    (2006.01)
*G06T 11/20*    (2006.01)

(52) U.S. Cl.
CPC ............. *G06K 9/46* (2013.01); *G06T 11/20* (2013.01); *G06K 2209/01* (2013.01); *G06T 2210/12* (2013.01)

(58) Field of Classification Search
CPC ...... G06K 9/46; G06K 2209/01; G06T 11/20; G06T 2210/12
See application file for complete search history.

(56) References Cited

U.S. PATENT DOCUMENTS

| | | | |
|---|---|---|---|
| 6,741,745 B2 | 5/2004 | Dance | |
| 7,466,861 B2* | 12/2008 | Katoh | G06K 9/50 358/403 |
| 8,111,927 B2* | 2/2012 | Vincent | G06K 9/03 382/225 |
| 8,170,289 B1 | 5/2012 | Feng | |
| 8,352,855 B2 | 1/2013 | Levy | |
| 10,108,695 B1* | 10/2018 | Yeturu | G06F 16/285 |
| 10,169,650 B1* | 1/2019 | Ming | G06K 9/3233 |

(Continued)

OTHER PUBLICATIONS

High Performance Document Layout Analysis, Breuel, Thomas M. In Proceedings of Symposium on Document Image Understanding Technology, May 2003. 11 pages.

(Continued)

*Primary Examiner* — Phuoc Tran
(74) *Attorney, Agent, or Firm* — Medley, Behrens & Lewis, LLC

(57) ABSTRACT

Representative embodiments disclose mechanisms to create a text stream from raw OCR outputs. The raw OCR output comprises a plurality of bounding boxes, each bounding box defining a region containing text which has been recognized by the OCR system. A weight matrix is calculated that comprises a weight for each pair of bounding boxes. The weight representing the probability that a pair of bounding boxes belongs to the same cluster. The bounding boxes are then clustered along the weights. The resulting clusters are first ordered using an ordering criteria. The bounding boxes within each cluster are then ordered according to a second ordering criteria. The ordered clusters and bounding boxes are then arranged into a text stream.

20 Claims, 7 Drawing Sheets

(56) References Cited

U.S. PATENT DOCUMENTS

2008/0037873 A1    2/2008  Berkner

OTHER PUBLICATIONS

Recognizing Cursive Typewritten Text Using Segmentation-Free System, Khorsheed, Mohammad S. . In Scientific World Journal, vol. 2015. Apr. 2015. 7 pages.
Efficient Text Extraction Algorithm Using Color Clustering for Language Translation in Mobile Phone, Canedo-Rodriguez, et al. In Journal of Signal and Information Processing, vol. 3, May 2012. 10 pages.

* cited by examiner

STRUCTURAL CLUSTERING AND ALIGNMENT OF OCR RESULTS

FIELD

This application relates generally to optical character recognition (OCR). More specifically, the application relates to clustering and alignment of scattered OCR results in order to ensure proper alignment for further processing.

BACKGROUND

Optical Character Recognition (OCR) provides a link between the physical world, where characters, words, and so forth are printed on paper, and the electronic world where digital versions of the same exist and are processed. Raw OCR results typically exists in the form of scattered text blocks that are hard to consume by algorithms and systems that rely on OCR information.

It is within this context that the present embodiments arise.

DETAILED DESCRIPTION

Figure 1:
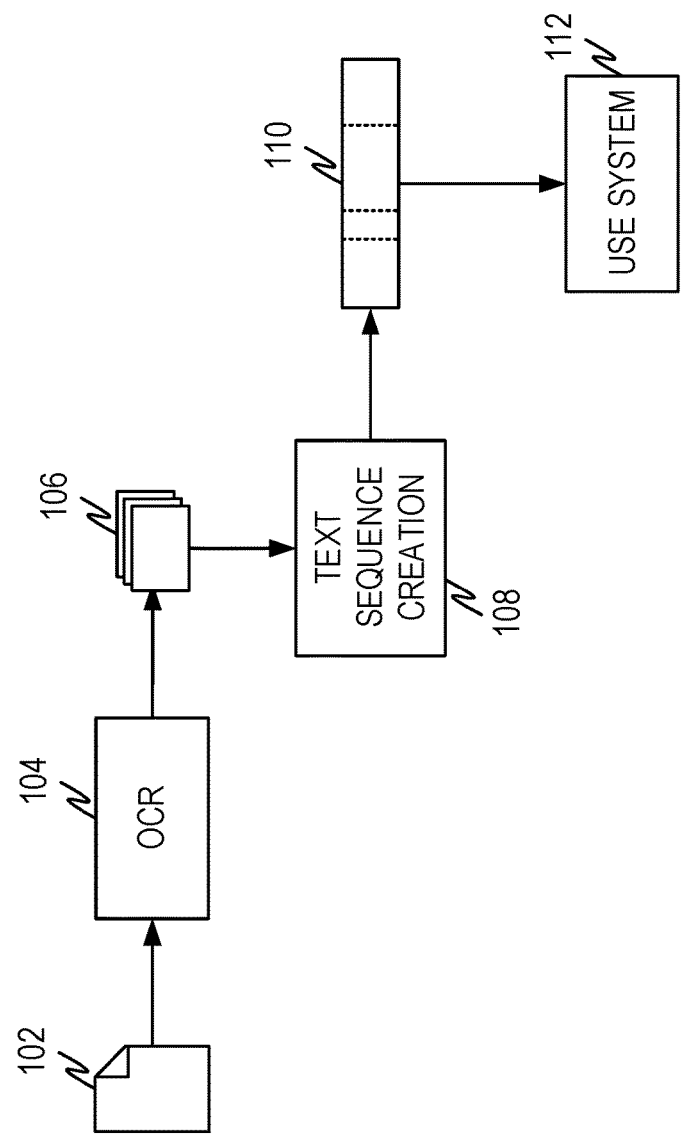
FIG. 1 illustrates an example architecture for creating a text sequence from scattered OCR blocks.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Physical pages from documents that are the subjected to optical character recognition (OCR) produce output in the form of scattered text blocks with locations corresponding to positions on a page from which they are recognized. These scattered text blocks can be words, lines, or larger blocks of text. Physical pages can have very complex layouts with text flowing from one part of the page to another in a wide variety of patterns, around figures or other non-textual items, and so forth. While it is very easy for humans to intuitively discern how the text flows from one location to another and discern whether text is part of the main text narrative, associated as a caption or sidebar for a figure or other non-textual item, and so forth, it is an extremely complex problem for a computer to solve. Traditional approaches have not performed well when trying to assemble a text stream from the scattered blocks of recognized text that are output from the OCR process.

OCR also plays an important role in artificial intelligence (AI) and other applications, since it acts as a bridge between the physical world and the digital world. The scattered text blocks that are output from an OCR process are difficult for applications to consume. Applications expect a text stream that can be parsed, manipulated, or otherwise used by the application to extract information and drive its operations.

The difficulty of assembling a coherent text stream, coupled with the difficulty an application has to consume the scattered blocks of an OCR process degrade computing device capability and performance. Embodiments of the present disclosure represent a technical improvement to computing devices as it extends their capability, replacing human intervention to properly align text boxes so a text stream can be created. Measurement on realistic data sets shows significant quality improvement compared with traditional and popular machine learning based approaches to solve this problem. As discussed below, a test sample of 75 images (e.g., text recognized pages) achieved a 13.8% pairwise constraint violate rate. In comparison, traditional approaches, using simple clustering (KMeans) yields a 24% pairwise constraint volition rate, which is barely usable and has significant errors.

Embodiments of the present disclosure receive as input, a plurality of bounding boxes that are the output of an OCR process. Each corresponding to a text block that has been recognized by the OCR process. Embodiments of the present disclosure create a text stream from these bounding boxes using three main three main stages. In the first stage, a weight matrix is created that has weights for each pair of bounding boxes. These weights are derived from real-world characteristics and represent an aggregate of characteristics that are related to the likelihood that the pair of bounding boxes belong to the same cluster.

Once the weight matrix is created, the bounding boxes are clustered using the weight matrix to group the bounding boxes into clusters. In this stage, embodiments typically use clustering methods that do not need the number of clusters as an input.

Once the clusters are created, the final stage is to order the clusters and then order the bounding boxes within the cluster. Ordering clusters is performed by calculating an order metric for each cluster and then sorting the clusters based on the order metric. Ordering bounding boxes within a cluster is performed by calculating a new weight matrix related to y-coordinate ordering of the bounding boxes within the cluster, clustering the bounding boxes within the cluster based on the new weights, and then sorting the bounding boxes first by y-coordinate and then by x-coordinate.

Description

FIG. 1 illustrates an example architecture 100 for creating a text sequence from scattered OCR blocks. A document 102, having one or more pages, is converted by an OCR process 104 into a plurality of bounding boxes 106. The bounding boxes represent locations on the page and have recognized text along with text properties. Thus, a typical bounding box will include coordinates for the bounding box such as top, bottom, left, and right coordinates, the recognized text, and text properties such as font size, line height, and so forth.

Embodiments of the present disclosure comprise mechanisms for text stream creation 108, that create a text stream 110 from the bounding boxes 106. The details of these embodiments are disclosed below. The text stream 110 can then be consumed by a system using the text stream 112. Examples of such systems include, but are not limited to, search systems (e.g., systems that users submit queries to in order to retrieve information, including information in or based on document 102), digital assistants, word processing or other office productivity systems/applications, and so forth.

Figure 2:
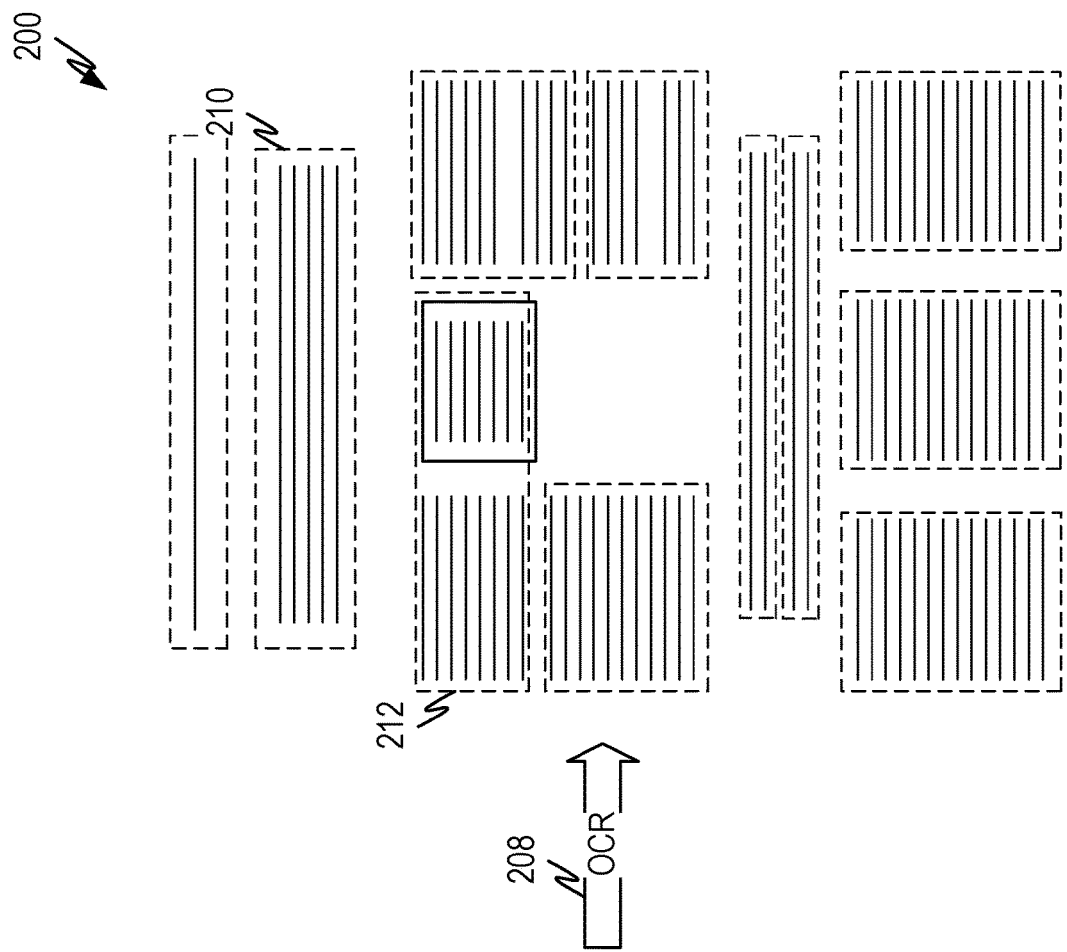
FIG. 2 illustrates a representative example of scattered blocks produced by an OCR system.
Figure 2:
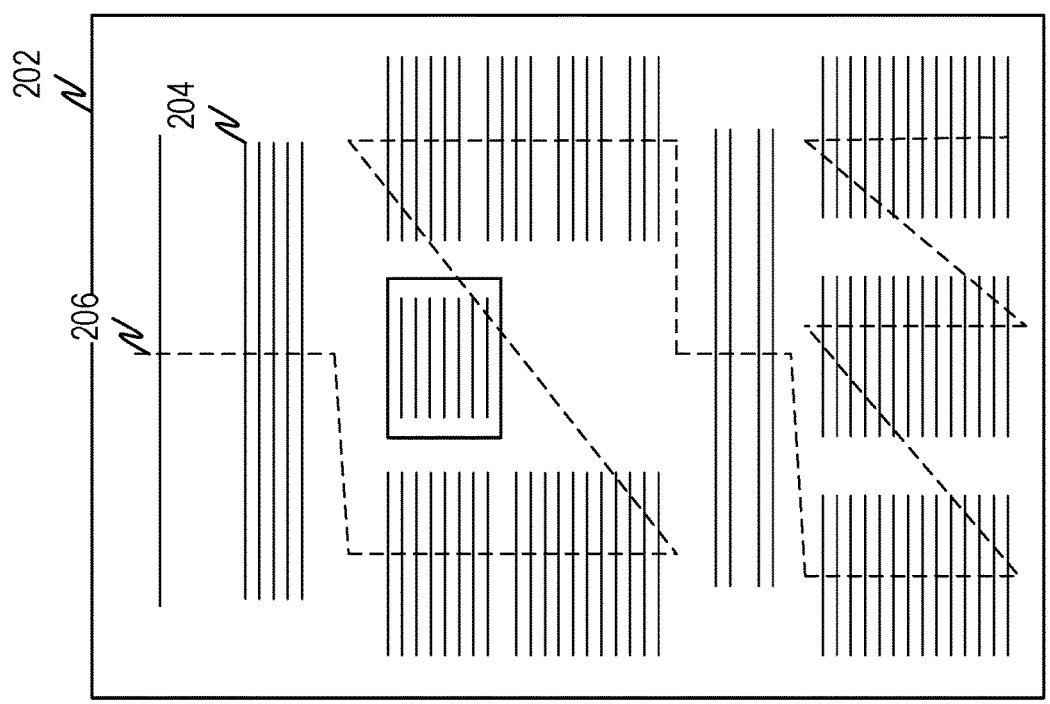

FIG. 2 illustrates a representative example 200 of scattered blocks produced by an OCR system 208. A document page 202 comprises a plurality of areas 204 that contain text. These are laid out on the page 202 and are intended to be read in a certain order as indicated by the dashed path 206. Humans are very good at looking at the text and discerning the proper order (path 206) so that the text is read in the proper order.

When the page 202 is text recognized by an OCR process 208, the result is a plurality of bounding boxes 210, 212. Examples of the data associated with or that is included with the bounding boxes 210, 212 are described above in conjunction with FIG. 1.

The embodiments of the present disclosure assemble the bounding boxes in the proper order to create a text stream of the recognized text.

Figure 3:
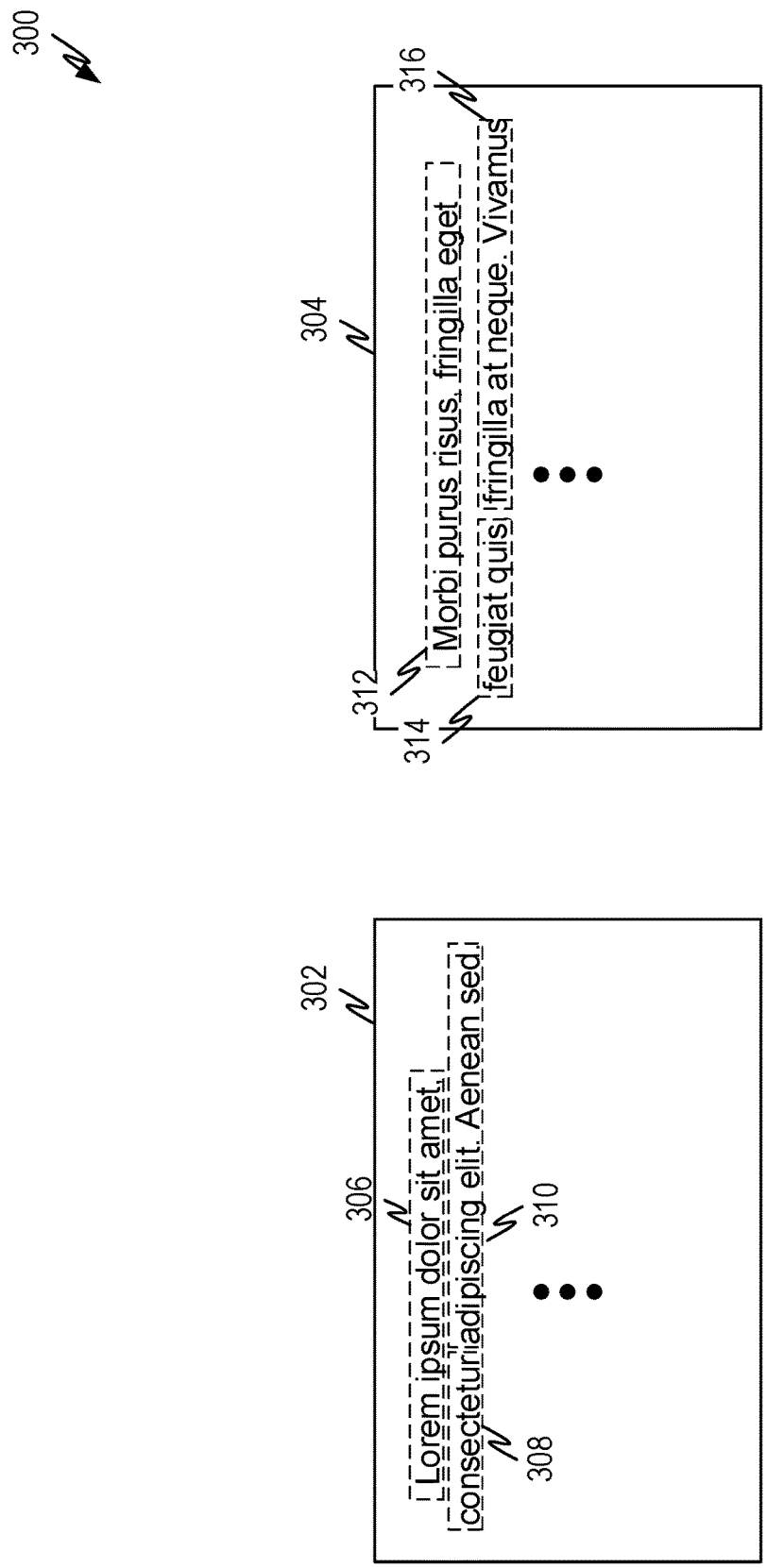
FIG. 3 illustrates a representative example of scattered blocks produced by an OCR system.

While the bounding boxes 210, 212 of FIG. 2 are shown to include larger blocks of text, the location information (e.g., bounding boxes) often have size and location for each line, and even word. FIG. 3 illustrates a representative example 200 of scattered blocks produced by an OCR system at the word and/or line level. The figure illustrates two columns of text 302, 304. The first column 302 comprises a line level bounding box 306, and two word level bounding boxes 308, 310, which can also represent a line level bounding box that has been inadvertently split into two. Similarly, the second column 304 comprises a line level bounding box 312 and a line level bounding box that has been split by the OCR process 314, 316, which is a fairly common occurrence. The bounding boxes 306-316 are shown as non-overlapping and as relatively tight to the words within, but the raw bounding boxes from an OCR process are not necessarily as neat as the illustrated bounding boxes and can overlap or have other artifacts.

If the OCR process processes top to bottom, the bounding boxes may have an order such as 306, 312, 308, 310, 314, and 316. If the system simply converts the bounding boxes into a text stream by concatenating the boxes in the order they are produced by the OCR process, it is clear that the constructed text stream will produce out of order text and otherwise not accurately reproduce the input text stream. Embodiments of the present disclosure produce significant quality improvement when utilized on realistic data sets compared with traditional and popular machine learning based approaches to solve this problem.

Figure 4:
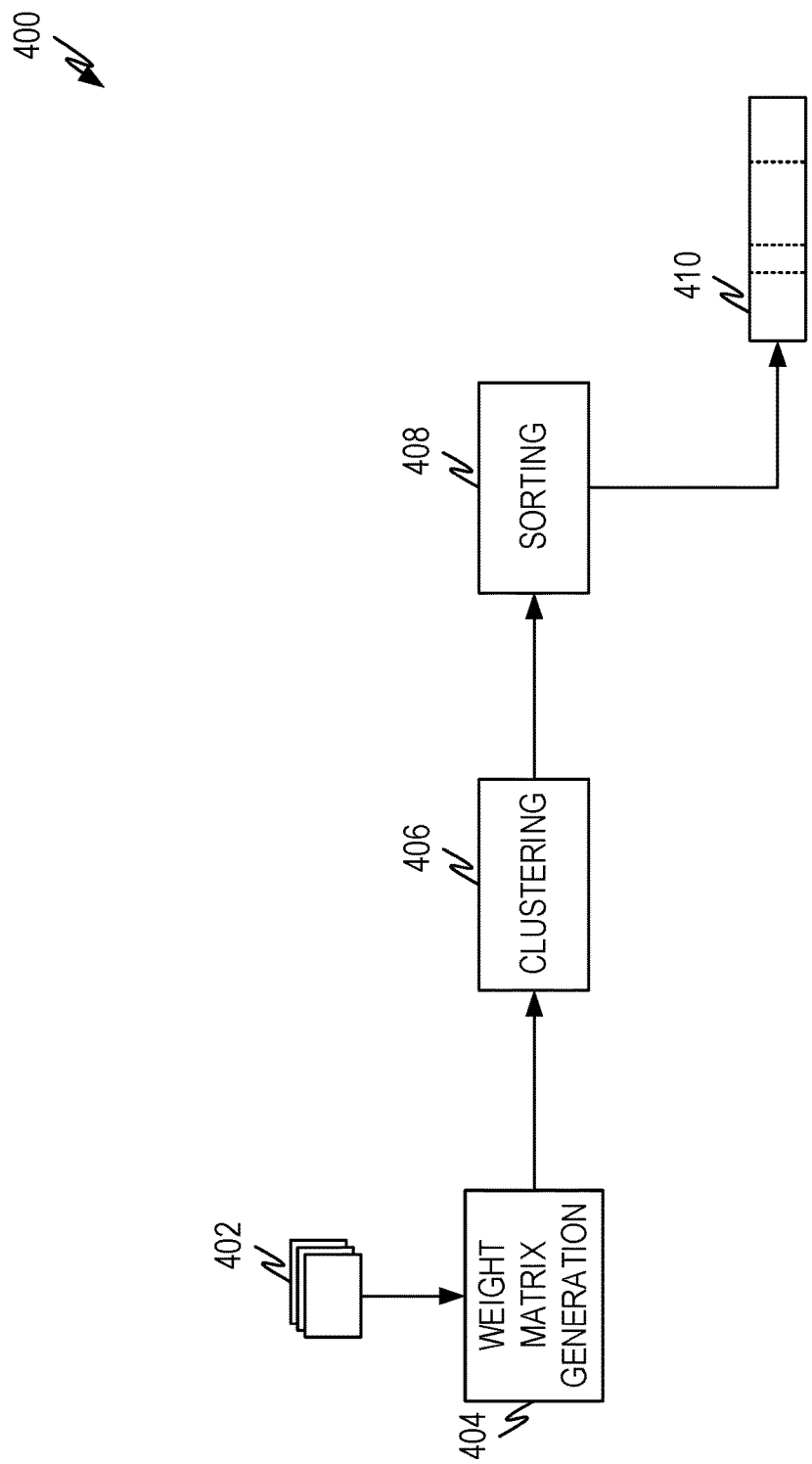
FIG. 4 illustrates a representative example architecture for converting scattered OCR blocks into a text sequence according to some aspects of the present disclosure.

FIG. 4 illustrates a representative example architecture 400 for converting scattered OCR blocks 402 into a text sequence 410 according to some aspects of the present disclosure. Embodiments of the present disclosure comprise one or more of the following stages or phases.

In the first stage 404, a weight matrix is created that has weights for each pair of bounding boxes. These weights are derived from real-world characteristics and represent an aggregate of characteristics that are related to the likelihood that the pair of bounding boxes belong to the same cluster. The weight matrix creation is discussed further below in conjunction with FIG. 5.

Once the weight matrix is created, the bounding boxes are clustered 406 using the weight matrix to group the bounding boxes into clusters. In this stage, embodiments typically use clustering methods that do not need the number of clusters as an input. Clustering is discussed in greater detail below.

Once the clusters are created, the final stage 408 is to order the clusters and then order the bounding boxes within the cluster. Ordering clusters is performed by calculating an order metric for each cluster and then sorting the clusters based on the order metric. Ordering bounding boxes within a cluster is performed by calculating a new weight matrix related to y-coordinate ordering of the bounding boxes within the cluster, clustering the bounding boxes within the cluster based on the new weights, and then sorting the bounding boxes first by y-coordinate and then by x-coordinate. This is discussed further in conjunction with FIG. 6 below.

Figure 5:
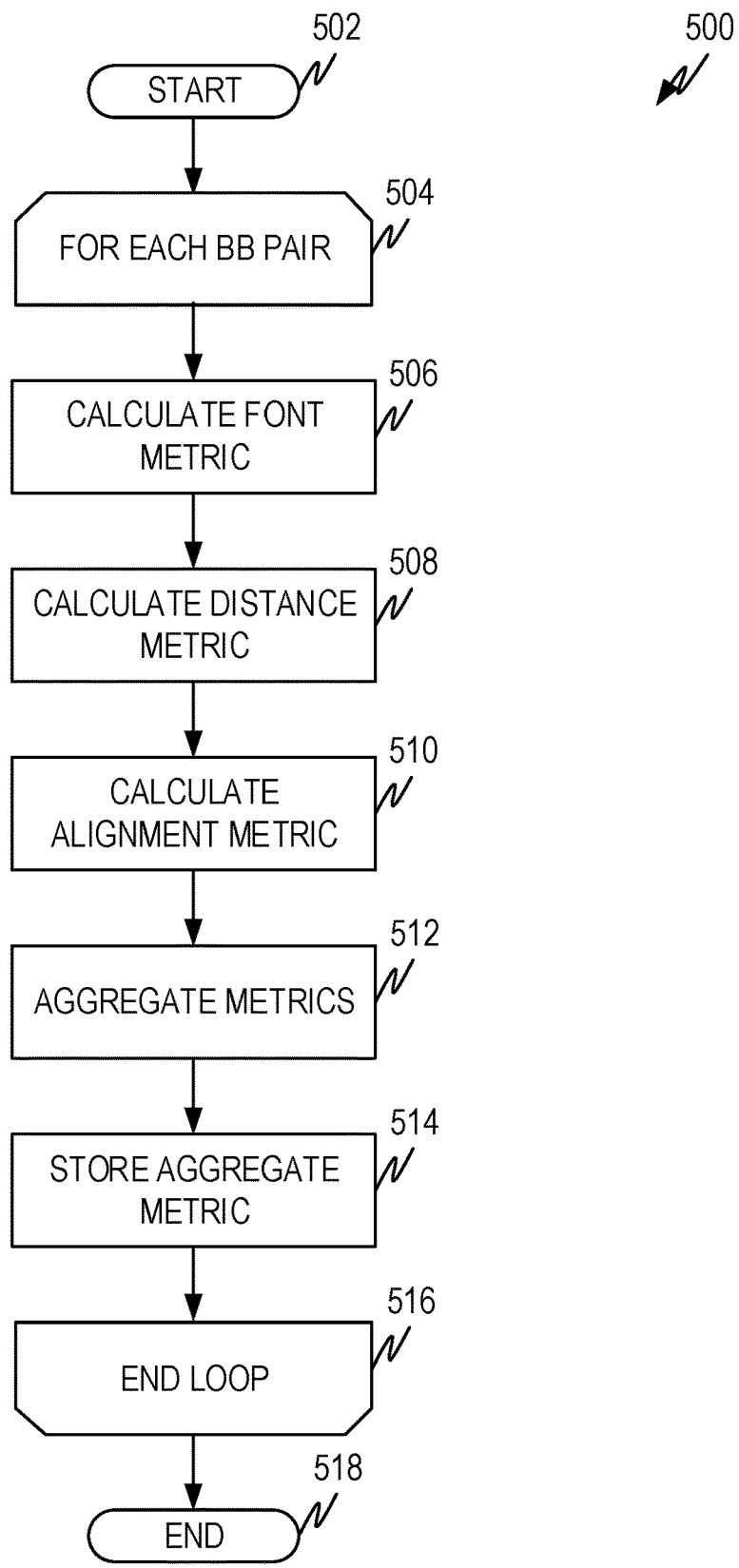
FIG. 5 illustrates a representative flow diagram for producing a weight matrix according to some aspects of the present disclosure.

FIG. 5 illustrates a representative flow diagram 500 for producing a weight matrix according to some aspects of the present disclosure. The weight matrix generation process 500 takes bounding boxes, such as line level bounding boxes produced by an OCR process, and determines pairwise similarity between the boxes. Each bounding box comprises coordinates, such as the left, top, right, and bottom coordinates for the box. The coordinate system is the image (page from which the text is recognized) coordinate system. In this disclosure, the operations are performed on a page of the document at a time. However, that is simply a representative example. Any unit of a document, or the whole document itself, can be processed at once as long as the bounding boxes have coordinates that describe their location within whatever unit of the image of the document is being processed.

The weight matrix created by the process 500 loops over each bounding box pair with the loop starting at operation 504. Thus, the weight matrix it a square matrix with the number of entries equal to the number of pairs of bounding boxes given by n×n where n is the number of bounding boxes. Each weight represents the similarity of the bounding box pair.

To calculate the pairwise similarity weight, a probabilistic model is used that represents an aggregation of individual probability metrics. In a representative example, the model aggregates two or more of a font metric, a distance metric, and/or an alignment metric. Using the aggregation of all metrics as an example, the pairwise similarity metric is given by:

$$p(\text{BBox}_1, \text{BBox}_2) = p_f(\text{BBox}_1, \text{BBox}_2)^{\lambda_f} + p_d(\text{BBox}_1, \text{BBox}_2)^{\lambda_d} + p_a(\text{BBox}_1, \text{BBox}_2)^{\lambda_a} \quad (1)$$

Where $p_f$ is a font size metric, $p_d$ is a distance metric, and $p_a$ is an alignment metric. The weights $\lambda_f$, $\lambda_d$, and $\lambda_a$ are used to adjust the relative importance of the terms and can be determined through testing of the model using representative data and adjusting the weights to minimize error rates. In one representative example, weights $\lambda_f$, $\lambda_d$, and $\lambda_a$ are selected as:

$$\lambda_f = \frac{1}{N(0|0, \sigma_f)}$$

$$\lambda_d = \frac{2}{N(0|0, \sigma_d)}$$

$$\lambda_a = \frac{1}{N(0|0, \sigma_a)}$$

Where $N(0|0, \sigma_x)$ is a Gaussian distribution with zero mean and $\sigma_x$ standard deviation evaluated at 0. The denominators are designed to normalize the impact when $\sigma_x$ is tuned. In other words, the weights are decoupled from the standard deviations through this design. The values for $\sigma_x$ are discussed further below.

Operation 506 illustrates calculation of the font metric. Text from the same block and/or region of a document usually has a consistent font size. A Gaussian distribution model can be used to model the probability that the fonts in two bounding boxes are the same size. Thus, the font metric is defined as:

$$p_f(BBox_1, BBox_2) = N(\Delta_f | 0, \sigma_f) \quad (2)$$

Where $N(x|0, \sigma_f)$ is a Gaussian distribution with zero mean and $\sigma_f$ standard deviation evaluated at x. $\Delta_f$ is the difference of the height of the two text blocks, such as the difference in pixels or some other height measure. In one representative embodiment, $\sigma_f = 0.6$.

Operation 508 illustrates calculation of the distance metric. When two bounding boxes are close to each other, they are more likely to belong to the same sequence of text. In the process 400, and as discussed below, bounding boxes are clustered together to identify bounding boxes that contain text that is part of the same sequence of text. A Gaussian distribution model can be used to model the probability that the two bounding boxes belong to the same cluster. Thus, the distance metric is defined as:

$$p_d(BBox_1, BBox_2) = N(\Delta_d | 0, \sigma_d) \quad (3)$$

Where $N(x|0, \sigma_d)$ is a Gaussian distribution with zero mean and $\sigma_d$ standard deviation evaluated at x. $\Delta_d$ is the spatial difference in the image coordinate between two bounding boxes. In order to make $\Delta_d$ independent of the font size, the average line height of the two bounding boxes is used as the distance measure rather than pixel size. In one representative embodiment, $\sigma_d = 1.0$.

Operation 510 illustrates calculation of the alignment metric. The alignment metric captures the left, right, top or bottom alignment across texts. Such alignment usually indicates the texts are from the same paragraph. In one embodiment, the difference in alignment is calculated as:

$$\Delta_a = \min(\Delta_L, \Delta_T, \Delta_R, \Delta_B) \quad (4)$$

Where $\Delta_L$, $\Delta_T$, $\Delta_R$, $\Delta_B$ are the difference between the left, top, right, and bottom coordinates of the two bounding boxes, respectively.

A Gaussian distribution model can be used to model the probability that the two bounding boxes belong to the same cluster. Thus, the distance metric is defined as:

$$p_a(BBox_1, BBox_2) = N(\Delta_a | 0, \sigma_a) \quad (5)$$

Where $N(x|0, \sigma_a)$ is a Gaussian distribution with zero mean and $\sigma_a$ standard deviation evaluated at x. $\Delta_a$ is the alignment difference given by equation (4). In one representative embodiment, $\sigma_a = 0.05$.

The formulation of equation (1) has no problem in theory and can be calculated in a computer. However, for numerical stability when trying to calculate $p(BBox_1, BBox_2)$ when the terms are close to zero, a different formulation can be used. The log likelihood formulation, which has greater numerical stability, can be used and is given by:

$$\log(p(BBox_1, BBox_2)) = \lambda_f \log(p_f(BBox_1, BBox_2)) + \lambda_d \log(p_d(BBox_1, BBox_2)) + \lambda_a \log(p_a(BBox_1, BBox_2)) \quad (6)$$

Operation 512 aggregates the selected metrics (any combination of some or all of the font metric, the distance metric, and/or the alignment metric). Operation 512 can be implemented by using equation (6) for the selected metrics for the pair of line level bounding boxes under consideration in the current iteration of the loop beginning at operation 504 and ending in operation 516.

The aggregated scores for each the pair of line level bounding boxes under consideration in the current iteration of the loop is stored in the appropriate location of an adjacency matrix in operation 514.

The loop ends at operation 516. Once all iterations of the loop are completed, the adjacency matrix will have all the weights for all pairs of line level bounding boxes and the method ends at operation 518.

Returning to FIG. 4 for a moment, after the weight matrix is calculated in stage 404, the next stage 406 clusters the bounding boxes using the weights in the weight matrix. The clusters gather together the line level bounding boxes that are likely part of the same sequence of text so they can be placed in the proper order. As it is not known a-priori how many clusters there are, clustering methods that do not require the number of clusters as an input are generally used in the embodiments of the present disclosure.

One such suitable clustering method is Affinity Propagation. This clustering method is known in the art and the details need not be repeated herein. Affinity Propagation is a clustering algorithm that does not require the number of clusters to be determined before running the algorithm. Affinity Propagation works by iteratively refining a randomly-chosen initial set of exemplars (members of the input set that are representative of clusters).

As input, it takes in a set of pairwise similarities between data points and finds clusters on by maximizing the total similarity between data points and their exemplars. The pairwise similarities is the weight matrix calculated in stage 404 and as detailed above in conjunction with FIG. 5.

Other clustering methods can also be used in place of Affinity Propagation if desired.

Figure 6:
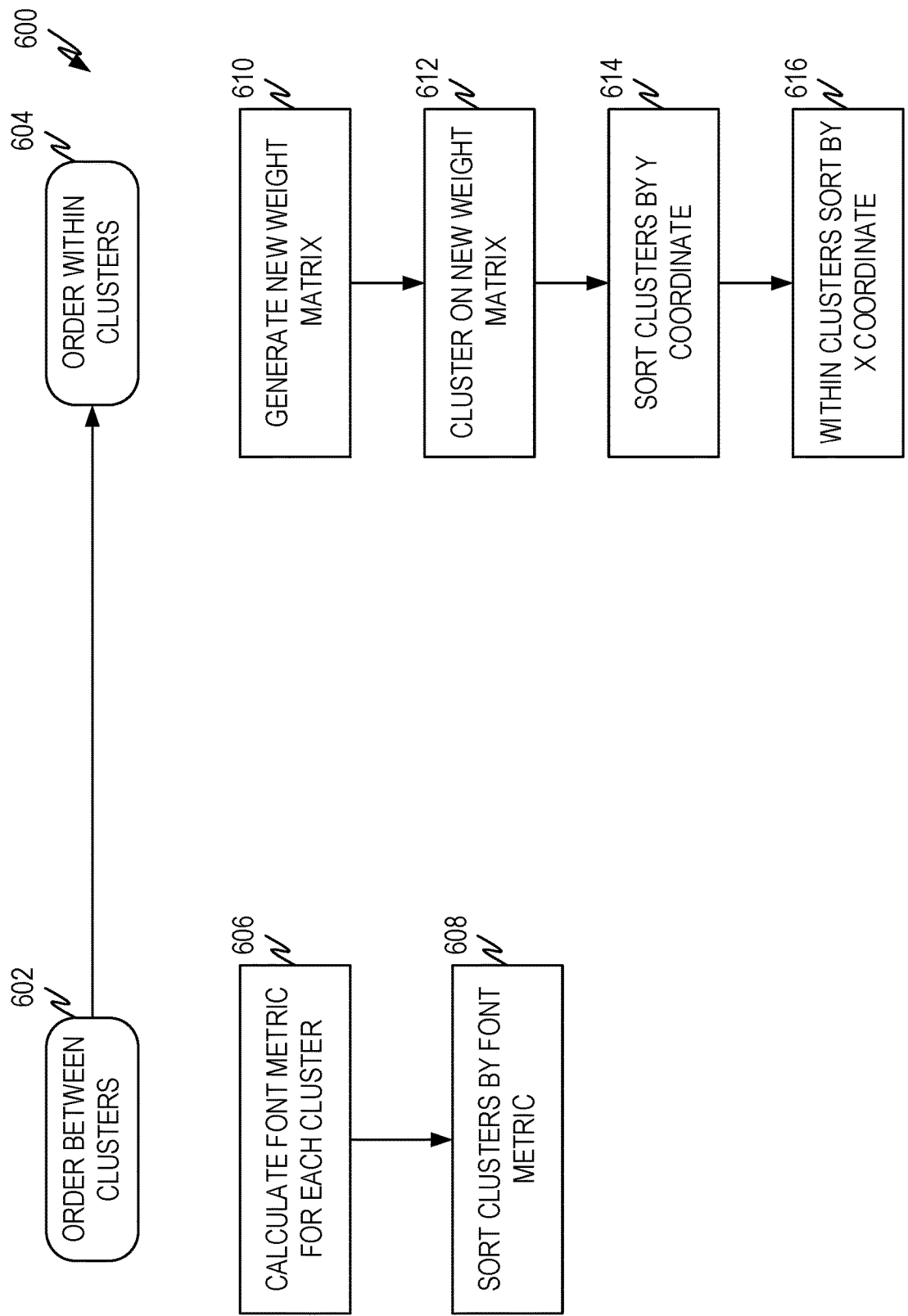
FIG. 6 illustrates a representative example of ordering between clusters and ordering within clusters according to some aspects of the present disclosure.

After clustering in stage 406, the next stage 408 is to sort the clusters and text within the clusters into a proper order so that the text sequence 410 can be created by concatenating the text within the bounding boxes according to the determined order. FIG. 6 discusses one representative example of how sorting stage 408 can be implemented.

FIG. 6 illustrates a representative example 600 of ordering between clusters 602 and ordering within clusters 604 according to some aspects of the present disclosure. As indicated in the figure, the ordering of the clusters is first determined as illustrated in 602 and then the ordering of the bounding boxes within each cluster is performed as illustrated in 604.

Ordering of the clusters 602 comprises two operations. The first operation 606 is to calculate a metric that will be used to order the clusters. One metric used in some embodiments is a font metric, such as that given by equation (2) or the log likelihood of equation (2). To calculate the font metric that will be used to order the clusters, the average font metric ($p_f$ or $\log(p_f)$) for each cluster is calculated. This average font metric is then used to order the clusters in operation 608. The clusters are sorted (operation 608) so that they are arranged from the largest to smallest value.

After the clusters are sorted, the bounding boxes in each cluster are sorted according to the operations 610-616. Stated another way, operations 610-616 are performed for each cluster.

In operation 610 a new weight matrix is generated that contains pairwise weights that help sort the bounding boxes within a cluster by y-coordinate. The pairwise weights are given by:

$$w(BBox_1, BBox_2) = w_y(BBox_1, BBox_2) + w_u(BBox_1, BBox_2) \quad (7)$$

Where $w(BBox_1, BBox_2)$ is the weight for the bounding box pair containing line bounding box 1 and line bounding box 2. $w_y(BBox_1, BBox_2)$ is used to measure how close the top boundaries of the bounding boxes are to each other and is calculated as the difference in the distance of the top coordinates:

$$w_y(BBox_1, BBox_2) = abs(T_1 - T_2) \quad (8)$$

Where $T_1$ is the top coordinate of bounding box 1 and $T_2$ is the top coordinate of bounding box 2.

$w_u(BBox_1, BBox_2)$ is a weight that corresponds to the intersection over union and is used to measure how much the blocks overlap with each other in the x-coordinate direction. It is calculated by dividing the length of the segment where their x-coordinates are the same by the total length covered by both boxes. Thus, if $\max(L_1, L_2) < \min(R_1, R_2)$ then:

$$w_u(BBox_1, BBox_2) = \frac{\min(R_1, R_2) - \max(L_1, L_2)}{\max(R_1, R_2) - \min(L_1, L_2)} \quad (9)$$

Otherwise the bounding boxes do not overlap and $w_u(BBox_1, BBox_2) = 0$. In equation (9), $R_1$ and $L_1$ are the right and left coordinates of bounding box 1, respectively, and $R_2$ and $L_2$ are the right and left coordinates of bounding box 2, respectively.

The weights, $w(BBox_1, BBox_2)$, for each line bounding box pair are stored in an adjacency matrix.

Operation 612 then uses the adjacency matrix as the input for a clustering method, such as affinity propagation to yield secondary bounding box clusters. These clusters are termed secondary bounding box clusters to distinguish them from the clusters that were created by operation 406 and that were ordered by operation 602.

Operation 614 then sorts the secondary bounding box clusters by the average y-coordinate of the bounding box top boundary inside the bounding box cluster from least to greatest.

Operation 616 then sorts the bounding boxes within each secondary bounding box cluster using the x-coordinate of the bounding box's left boundary.

The result is that all the bounding boxes have been ordered, first by cluster and then by bounding box within each cluster. The bounding boxes are then placed in the output text sequence starting with the first bounding box of the first cluster and ending with the last bounding box of the last cluster.

Example Machine Architecture and
Machine-Readable Medium

Figure 7:
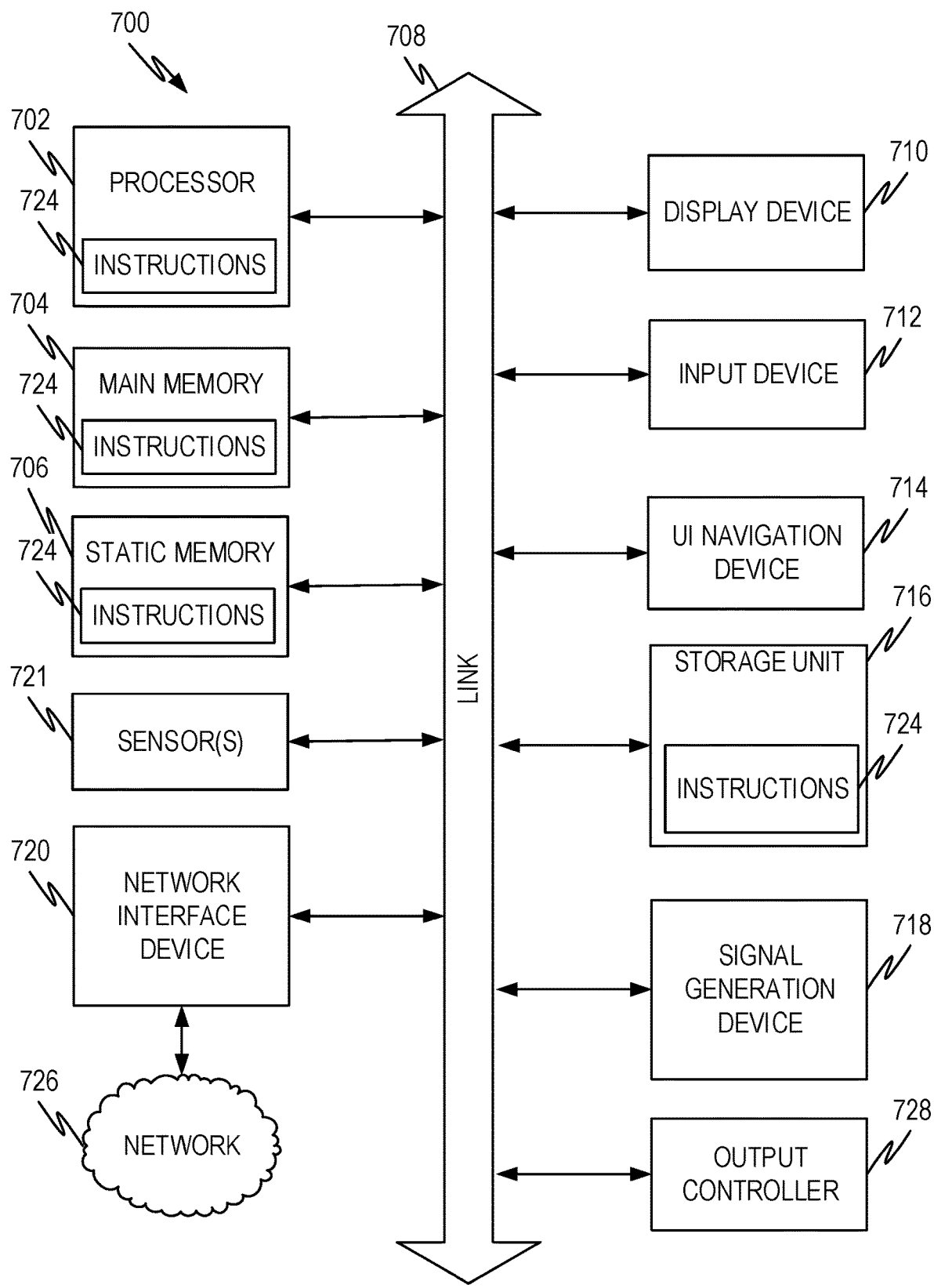
FIG. 7 illustrates a representative machine architecture suitable for implementing the systems and other aspects disclosed herein or for executing the methods disclosed herein.

FIG. 7 illustrates a representative machine architecture suitable for implementing the systems and other aspects disclosed herein or for executing the methods disclosed herein. The machine of FIG. 7 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 7 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 700 includes at least one processor 702 (e.g., a central processing unit (CPU), a graphics processing unit (GPU), advanced processing unit (APU), or combinations thereof), one or more memories such as a main memory 704, a static memory 706, or other types of memory, which communicate with each other via link 708. Link 708 may be a bus or other type of connection channel. The machine 700 may include further optional aspects such as a graphics display unit 710 comprising any type of display. The machine 700 may also include other optional aspects such as an alphanumeric input device 712 (e.g., a keyboard, touch screen, and so forth), a user interface (UI) navigation device 714 (e.g., a mouse, trackball, touch device, and so forth), a storage unit 716 (e.g., disk drive or other storage device(s)), a signal generation device 718 (e.g., a speaker), sensor(s) 721 (e.g., global positioning sensor, accelerometer(s), microphone(s), camera(s), an eye tracking subsystem, and so forth), output controller 728 (e.g., wired or wireless connection to connect and/or communicate with one or more other devices such as a universal serial bus (USB), near field communication (NFC), infrared (IR), serial/parallel bus, etc.), and a network interface device 720 (e.g., wired and/or wireless) to connect to and/or communicate over one or more networks 726.

Rather than the more conventional microprocessor, Neural Network chips can be used to implement embodiments of the present disclosure. Neural Network chips are specialized chips designed to execute various forms of neural networks. As such, they are suitable for use in implementing aspects of the present disclosure such as the source separators 910 and other neural network aspects of the present disclosure. Based on the disclosure contained herein, those of skill in the art will know how to implement the embodiments of the present disclosure using one or more neural network chips.

Additionally, beamformers (e.g., beamformer 906) and microphone arrays (e.g., microphone array 904) are often implemented in whole or in part using discrete circuitry or specialized circuitry tailored to the design. This is particularly true where fixed beamformers such as those discussed that form beams at 30 degree offsets from each other are utilized with an appropriate array microphone. These are all suitable for implementation of embodiments of the present disclosure and those of skill in the art will understand how to implement embodiments of the present disclosure based on the disclosure contained herein.

Once the inside and outside have been distinguished and the distance values and/or sign appropriately adjusted, the signed distance field can be stored in one channel of the texture. Since textures have more than one channel (e.g., one channel each for the red, green, and blue information of the texture) additional information can be stored in the other channels of the texture. For example, a first channel can be used to store the signed distance field. A second channel can be used to store an unsigned distance field. A third channel can be used to store information about shape properties such as fill properties and/or line properties (width, dash size, join type, etc.). The texture can then be used to create high-resolution graphics as is known by those of skill in the art.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, communication mechanisms, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A computer implemented method for converting OCR blocks into a text stream, comprising:
receiving a plurality of bounding boxes from an OCR system, each bounding box defining a region containing text which has been recognized by the OCR system;
for each bounding box pair in the plurality of bounding boxes, calculating a weight comprising the probability that the bounding box pair belong to a cluster;
clustering the bounding boxes along the weights to produce at least one cluster comprising one or more bounding boxes;
for each of the at least one cluster:
ordering the at least one cluster relative to other clusters; and
ordering the bounding boxes within the at least one cluster; and
merging text within the bounding boxes into a text string according to the two ordering operations.

Example 2

The method of example 1 wherein weight comprises at least one of:
a font size metric;
a distance metric; and
an alignment metric.

Example 3

The method of example 2 wherein the weight comprises an aggregate of two or more of the font size metric, the distance metric, and the alignment metric.

Example 4

The method of example 2 wherein:
the font size metric comprises a probability based on a font size difference between two bounding boxes;
the distance metric comprises a probability based on a distance difference between two bounding boxes; and
the alignment metric comprises a probability based on a coordinate difference between two bounding boxes.

Example 5

The method of example 1, 2, 3, or 4 wherein clustering the bounding boxes along the weights to produce at least one cluster comprising one or more bounding boxes comprises clustering using affinity propagation.

Example 6

The method of example 1, 2, 3, 4, or 5 wherein ordering the at least one cluster relative to other clusters comprises:
calculating a font metric for each cluster; and
sorting the at least one cluster on the font metric.

Example 7

The method of example 1, 2, 3, 4, 5, or 6 wherein ordering the bounding boxes within the at least one cluster comprises:
for each cluster in the at least one cluster:
for each bounding box pair within the cluster, calculating a second weight comprising the probability that the bounding box pair belong to a cluster;
clustering the bounding boxes within the cluster according to the second weight to produce second clusters;
sorting the second clusters according to y-coordinate;
within each cluster of the second clusters, sort bounding boxes by x-coordinate.

Example 8

The method of example 7 wherein the second weight comprises an aggregation of a y-coordinate metric and an intersection over union metric.

Example 9

The method of example 7 wherein clustering the bounding boxes within the cluster comprises clustering using affinity propagation.

Example 10

The method of example 1, 2, 3, 4, 5, 6, 7, 8, or 9 further comprising sending the text stream to a consuming system.

Example 11

The method of example 10 wherein the consuming system comprises one or more of:
a digital assistant;
an office productivity application; and
a system comprising a machine learning model.

Example 12

An apparatus comprising means to perform a method as in any preceding example.

Example 13

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computer implemented method for converting OCR blocks into a text stream, comprising:
receiving a plurality of bounding boxes from an OCR system, each bounding box defining a region containing text which has been recognized by the OCR system;
for each bounding box pair in the plurality of bounding boxes, calculating a weight comprising the probability that the bounding box pair belong to a cluster;
clustering the bounding boxes along the weights to produce at least one cluster comprising one or more bounding boxes;
for each of the at least one cluster:
ordering the at least one cluster relative to other clusters; and
ordering the bounding boxes within the at least one cluster; and
merging text within the bounding boxes into a text string according to the two ordering operations.

2. The method of claim 1 wherein weight comprises at least one of:
a font size metric;
a distance metric; and
an alignment metric.

3. The method of claim 2 wherein the weight comprises an aggregate of two or more of the font size metric, the distance metric, and the alignment metric.

4. The method of claim 2 wherein:
the font size metric comprises a probability based on a font size difference between two bounding boxes;
the distance metric comprises a probability based on a distance difference between two bounding boxes; and
the alignment metric comprises a probability based on a coordinate difference between two bounding boxes.

5. The method of claim 1 wherein clustering the bounding boxes along the weights to produce at least one cluster comprising one or more bounding boxes comprises clustering using affinity propagation.

6. The method of claim 1 wherein ordering the at least one cluster relative to other clusters comprises:
calculating a font metric for each cluster; and
sorting the at least one cluster on the font metric.

7. The method of claim 1 wherein ordering the bounding boxes within the at least one cluster comprises:
for each cluster in the at least one cluster:
for each bounding box pair within the cluster, calculating a second weight comprising the probability that the bounding box pair belong to a cluster;
clustering the bounding boxes within the cluster according to the second weight to produce second clusters;
sorting the second clusters according to y-coordinate;
within each cluster of the second clusters, sort bounding boxes by x-coordinate.

8. The method of claim 7 wherein the second weight comprises an aggregation of a y-coordinate metric and an intersection over union metric.

9. The method of claim 7 wherein clustering the bounding boxes within the cluster comprises clustering using affinity propagation.

10. The method of claim 1 further comprising sending the text stream to a consuming system.

11. A system comprising:
a processor coupled to memory storing executable instructions, which when executed by the processor cause the processor to perform operations comprising:
receiving a plurality of bounding boxes from an OCR system, each bounding box defining a region containing text which has been recognized by the OCR system;
for each bounding box pair in the plurality of bounding boxes, calculating a weight comprising the probability that the bounding box pair belong to a cluster;
clustering the bounding boxes along the weights to produce at least one cluster comprising one or more bounding boxes;
for each of the at least one cluster:
ordering the at least one cluster relative to other clusters; and
ordering the bounding boxes within the at least one cluster; and
merging text within the bounding boxes into a text string according to the two ordering operations.

12. The system of claim 11 wherein weight comprises at least one of:
a font size metric;
a distance metric; and
an alignment metric.

13. The system of claim 12 wherein the weight comprises an aggregate of two or more of the font size metric, the distance metric, and the alignment metric.

14. The system of claim 12 wherein:
the font size metric comprises a probability based on a font size difference between two bounding boxes;
the distance metric comprises a probability based on a distance difference between two bounding boxes; and
the alignment metric comprises a probability based on a coordinate difference between two bounding boxes.

15. The system of claim 11 wherein clustering the bounding boxes along the weights to produce at least one cluster comprising one or more bounding boxes comprises clustering using affinity propagation.

16. The system of claim 11 wherein ordering the at least one cluster relative to other clusters comprises:
calculating a font metric for each cluster; and
sorting the at least one cluster on the font metric.

17. The system of claim 11 wherein ordering the bounding boxes within the at least one cluster comprises:
for each cluster in the at least one cluster:
for each bounding box pair within the cluster, calculating a second weight comprising the probability that the bounding box pair belong to a cluster;
clustering the bounding boxes within the cluster according to the second weight to produce second clusters;
sorting the second clusters according to y-coordinate;
within each cluster of the second clusters, sort bounding boxes by x-coordinate.

18. The system of claim 17 wherein the second weight comprises an aggregation of a y-coordinate metric and an intersection over union metric.

19. The system of claim 17 wherein clustering the bounding boxes within the cluster comprises clustering using affinity propagation.

20. A computer storage medium comprising executable instructions that, when executed by a processor of a machine, cause the machine to perform acts comprising:
receiving a plurality of bounding boxes from an OCR system, each bounding box defining a region containing text which has been recognized by the OCR system;
calculating a first weight matrix comprising a first weight for each bounding box pair in the plurality of bounding boxes, the first weight comprising the probability that the bounding box pair belong to a cluster;
clustering the bounding boxes along the weights to produce a plurality of first clusters, each cluster having a plurality of bounding boxes;
for each cluster:
ordering the cluster relative to other clusters of the plurality of clusters; and
ordering the bounding boxes within the at least one cluster; and
merging text within the bounding boxes into a text string according to the two ordering operations.

* * * * *